March 22, 1960 J. L. WHITE 2,929,128
LOCKING AND SEALING MEANS FOR BURIAL CASKETS
Filed April 25, 1956 4 Sheets-Sheet 1
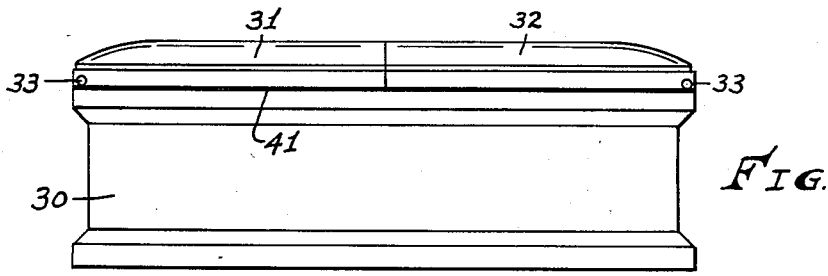
Fig. 1.
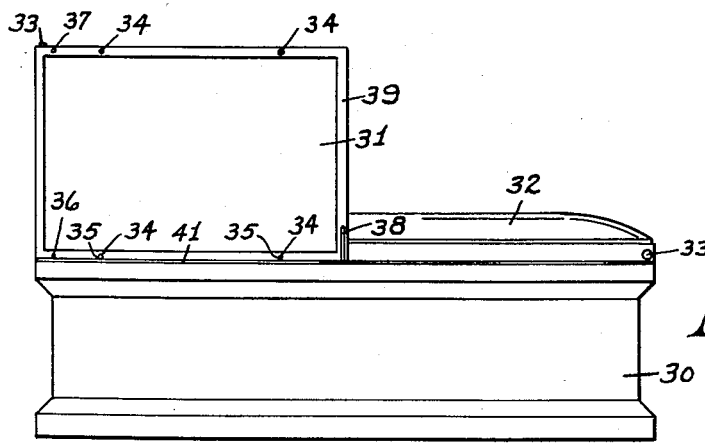
Fig. 2.
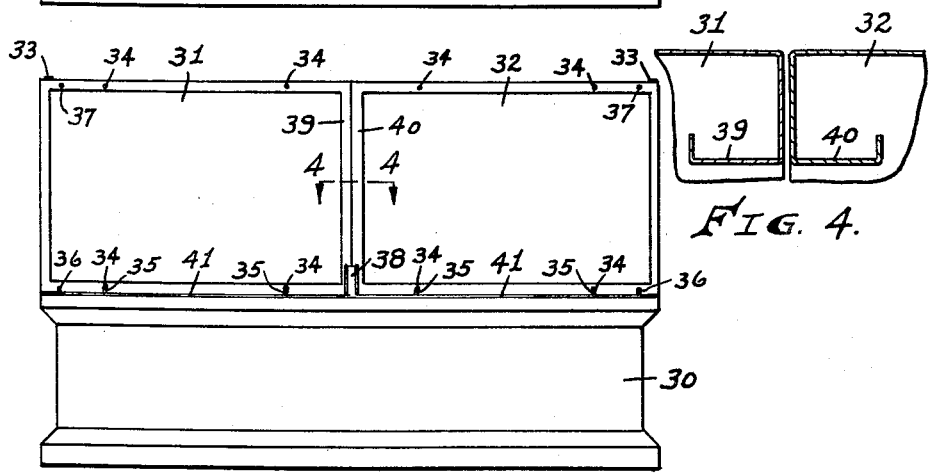
Fig. 3.
Fig. 4.
JOHN L. WHITE,
INVENTOR.
BY Donald E. Windle.
ATTORNEY.

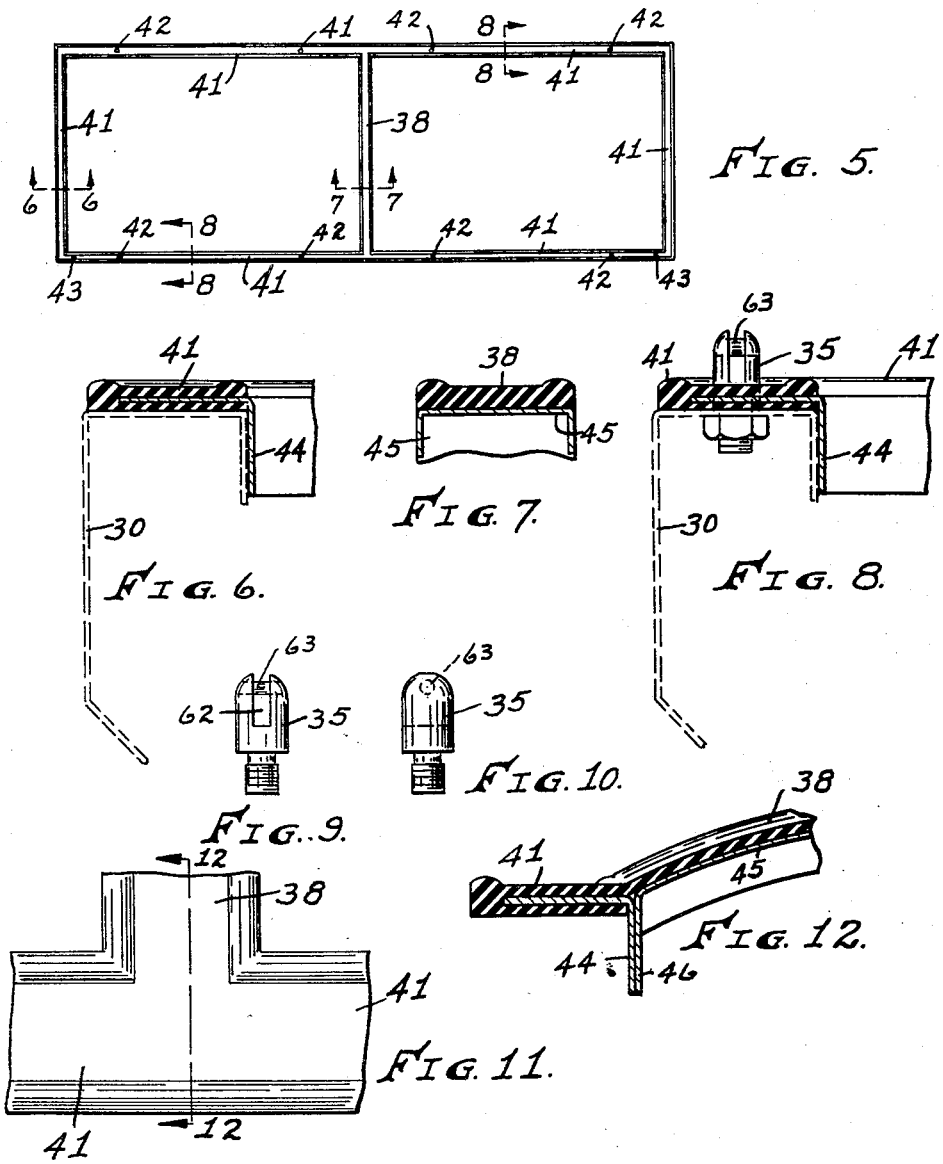

March 22, 1960  J. L. WHITE  2,929,128
LOCKING AND SEALING MEANS FOR BURIAL CASKETS
Filed April 25, 1956  4 Sheets-Sheet 3

JOHN L. WHITE,
INVENTOR.
BY Donald E. Windle.
ATTORNEY.

March 22, 1960  J. L. WHITE  2,929,128
LOCKING AND SEALING MEANS FOR BURIAL CASKETS
Filed April 25, 1956  4 Sheets-Sheet 4
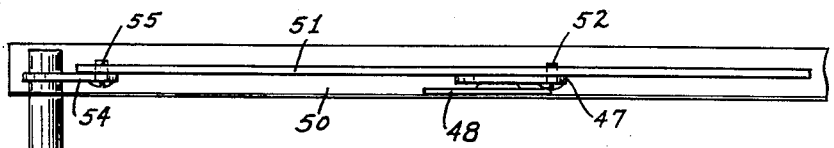
FIG. 19.
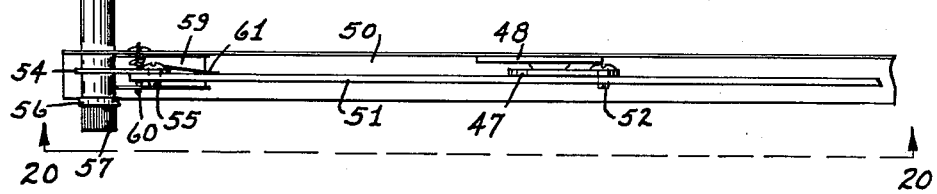
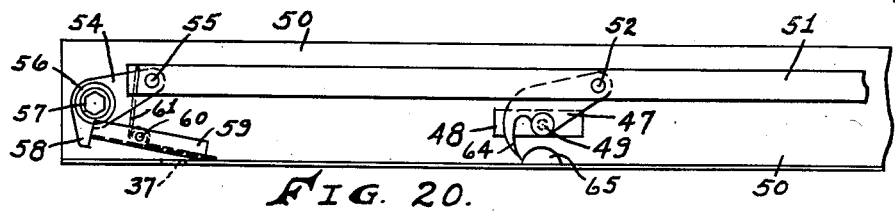
FIG. 20.
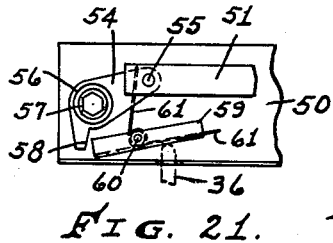
FIG. 21.
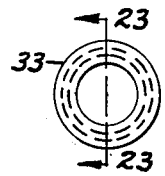
FIG. 22.
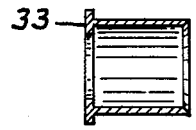
FIG. 23.
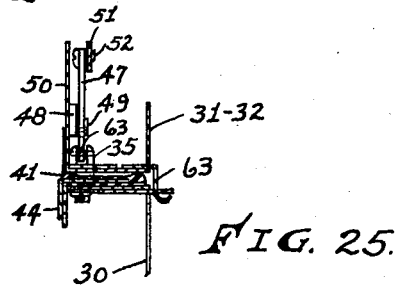
FIG. 25.
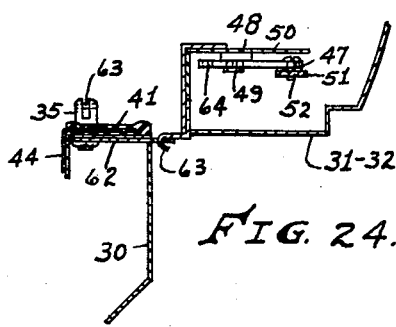
FIG. 24.
JOHN L. WHITE,
INVENTOR.
BY Donald E. Windle
ATTORNEY.

United States Patent Office 2,929,128
Patented Mar. 22, 1960

2,929,128

LOCKING AND SEALING MEANS FOR BURIAL CASKETS

John L. White, Knightstown, Ind.

Application April 25, 1956, Serial No. 580,492

3 Claims. (Cl. 27—14)

The present invention relates to locking and sealing means for burial caskets and more particularly to caskets having split lids, with separate means being provided for locking the lids, but with a single one-piece gasket being provided for sealing the transverse joint between the lids as well as the perimeter thereof.

I am well aware that sealing means as well as casket locking means are old in the art. However, the use of a unitary seal with no joints therein is considered as being new in the art. Also, the use of tamper proof locking devices as covered in this application are considered new in the art. The combination of the unitary sealing means and the associated tamper proof locking device provides effective means for permanently sealing the joints between the lids and between the lids and the body of the casket.

The principal object of the invention is the provision of a unitary seal which effectively seals the joints between each of the lids and between the lids and the body of the casket.

A second object is the provision of a gasket providing a double seal around the perimeter of the casket.

A third object is the provision of a unitary seal with the same being removable from the casket.

A further object is the provision of a locking device forcing the lid members into positive sealing contact with the gaskets, and with the locking device being provided with means preventing tampering therewith.

Further objects and particular advantages of the invention will become more apparent in the course of the following description, and that which is new will be pointed out in the appended claims, with reference being had to the accompanying drawings, in which:

Figure 1 is a front side elevation of a casket embodying the features of the invention, and with both of the lids being shown in closed condition.

Figure 2 is a front side elevation similar to that shown in Figure 1, but with one of the lids being shown in open position.

Figure 3 is also a front elevation similar to Figures 1 and 2, but with both lids being shown open.

Figure 4 is a detail section through the adjacent edges of the lids, as taken on line 4—4 of Figure 3.

Figure 5 is a top plan view of the unitary gasket sealing member.

Figure 6 is a detail section through an end portion of the gasket, as taken on line 6—6 of Figure 5, and with the adjacent or upper edge of the casket body being shown in broken lines.

Figure 7 is a detail section through the central transverse portion of the gasket member, taken on line 7—7 of Figure 5.

Figure 8 is a detail section, taken on line 8—8, through the forward and rearward longitudinal portions of the seal, with the upper edge of the casket body being shown in broken lines, and with lock-engaging studs being shown therein.

Figure 9 is a detail elevation of one of the lock-engaging studs.

Figure 10 is a side elevation of the lock-engaging stud.

Figure 11 is a top plan view of a portion of the gasket showing the juncture of the transverse seal with the perimeter seal.

Figure 12 is a detail section through the seal, taken on line 12—12 of Figure 11.

Figure 19 is a part plan view of a portion of the locking mechanism.

Figure 20 is a side elevation of the portion of the locking mechanism, taken from line 20—20 of Figure 19.

Figure 21 is an elevation similar to a portion of that shown in Figure 20, but showing the tamper proof portion of the device in disengaged relation.

Figure 22 is a front elevation of the sleeve sealing member used to provide a seal around the wrench-receiving socket of the locking mechanism.

Figure 23 is a detail longitudinal section through the sleeve member, taken on line 23—23 of Figure 22.

Figure 24 is a detail section through the hinge rail of the casket body and one of the lids showing the lid in open position, and Figure 25 is a detail section similar to that shown in Figure 24 but with the lid being shown in seal-contacting relation.

Like characters of reference designate like parts throughout the several views of the drawings.

Figure 13:
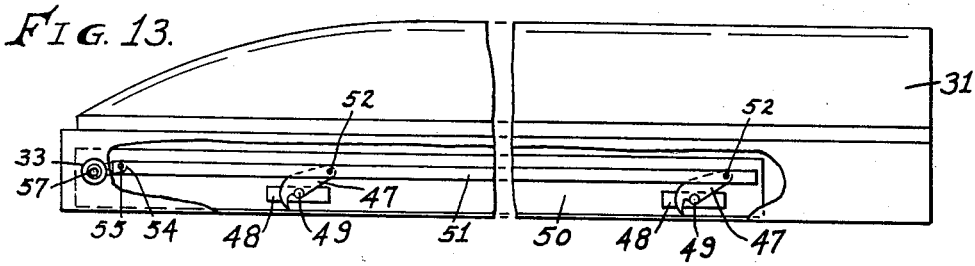
Figure 13 is a front elevation of the head lid, showing the locking mechanism positioned therein, and with the locking mechanism being shown in non-locking condition.
Figure 14:
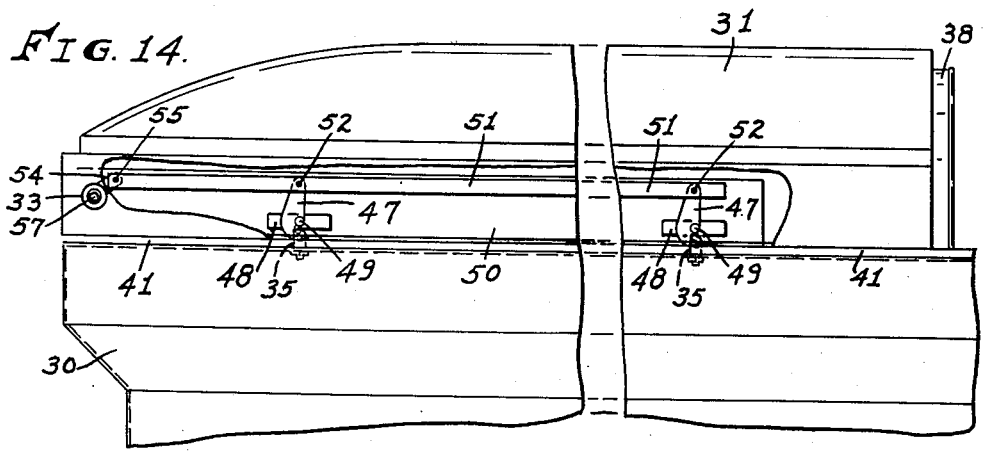
Figure 14 is an elevation similar to that shown in Figure 13, but with the locking mechanism being shown in engaged condition.

In order that the device and the construction thereof may be better understood and appreciated, I will now take up a detailed description thereof in which the same will be more fully set forth.

Referring now to the drawings in detail, Figure 1 shows a casket shell or body 30, having head lid 31 and foot lid 32. A locking mechanism operating stud-sealing sleeve 33 is shown near the end of each of the lids.

Figure 2 shows the casket with the head lid thereof in open position and with apertures formed in the sealing flange thereof, with the apertures being provided for the reception of respective lock-engaging studs 35 which are secured into the upper perimeter edge of the casket body. A lock-releasing pin 36 is also shown in Figure 2, with the same being secured into and projecting above the upper perimeter edge of the casket body and being adapted to extend upwardly through a respective aperture 37 in the lid.

Figure 3 shows both of the lids in open position and with apertures 34, lock-engaging studs 35, and lock-releasing pins 36 being shown for both of the lids. Figure 3 further shows a transverse seal 38 located in alignment with the adjacent edges of the two lids 31 and 32.

The adjacent edges of the lids 31 and 32 have inwardly-turned respective flanges 39 and 40 formed thereon, as shown in Figure 4, with the same being adapted to close in contacting relation with the transverse gasket or seal 38.

Figure 5 of the drawings shows the gasket or sealing member of the casket with the same being formed of a unit having the transverse portion 38 formed integrally with the perimeter seal for the reception of the respective lock-engaging studs 35, and with apertures 43 being provided for the reception of respective lock-releasing pins 36. A continuous slot is formed in the perimeter portion of the seal or gasket 41 for the reception of the horizontally-disposed leg of gasket frame angle 44, and with the vertically-disposed leg of the angle extending downwardly along the inner edge of the casket body, but with the angle being unsecured to the casket body. The transverse seal 38 is supported by means of member 45 which is formed to a curvature to coincide with flanges 39 and 40 of the lid members. The end portions 46 of the transverse seal-supporting member 45 are welded or otherwise suitably secured to the vertically-disposed leg of frame angle 44, as more clearly shown in Figure 12. It will be noted that, since frame angle 44 is not secured to the casket body flange, the same is removable with relation thereto. Lock-engaging studs 35 and lock-releasing pins 36, extending upwardly through respective apertures 42 and 43 prevent displacement of the frame angle 44 on the casket body.

Figures 13 through 21 show the locking device as well as the construction and operation thereof. The locking device is comprised of locking fingers 47 which are each pivotally mounted on a respective plate 48 by means of a pin 49. Plates 48 are secured on an angular-shaped frame member 50 which is adapted to be suitably secured in the edge portions of the lid members 31 and 32.

The upper end of each of the locking fingers 47 is pivotally secured to an operating bar 51 by means of a fastening 52. One of the operating bars 51 is located in the rear edge of its respective lid with a second operating bar 51 being located in the forward edge of the respective lid. An operating rod 53 is provided at one end of the angular-shaped frame members 50, with each end of the rod projecting through and journalled in the vertical leg of a frame member 50, as more clearly shown in Figure 19. Each end portion of rod 53 is provided with a cam plate 54 which is rigidly secured thereto and with each of the cam plates being connected with a respective operating bar 51 by means of a fastening 55. The front end of rod 53 is provided with a sealing washer 56 and is secured on the end of the rod by means of a wrench-receiving stud 57. A stud-sealing sleeve 33, as shown in detail in Figures 22 and 23, is provided to partially cover the end of the wrench-receiving stud 57 and is positioned thereon after the locking mechanism has been installed in the casket lid with the sleeve extending through an aperture provided in the forward face of the lid, and with the sleeve fitting snugly over the sealing washer 56 and providing a water-tight joint therebetween.

It will be noted, by referring to Figures 20 and 21, that a stop-engaging lug 58 is formed on the front cam plate 54 and is provided thereon for the purpose of rendering the device tamper proof. In providing the locking device from being operated while the lid is open, I use a stop member 59 of channel shape and pivotally supported on pin 60 and with the channel 59 being spring-urged into engagement with lug 58 by means of spring 61. Channel 59, when engaged with lug 58, prevents movement of operating bar 51 and maintains locking fingers 47 in disengaged position.

Figures 15, 16:
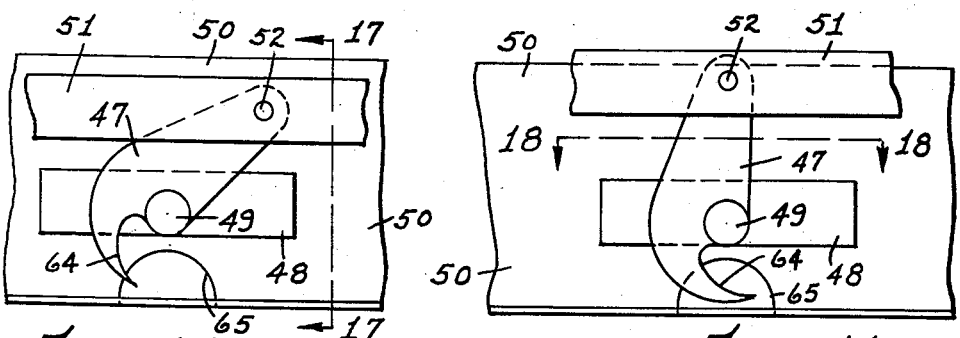
Figure 15 is an enlarged elevation of a portion of the locking mechanism and showing the stud-engaging finger being in disengaged position.
Figure 16 is an elevational view similar to that shown in Figure 15, but with the stud-engaging finger being shown in the position assumed when in locking or stud-engaging position.
Figure 17:
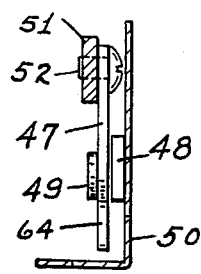
Figure 17 is a detail section, taken on line 17—17 of Figure 15.
Figure 18:
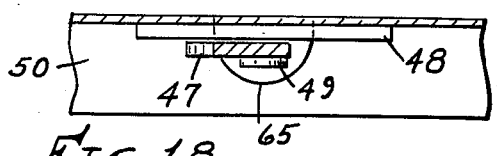
Figure 18 is a detail section, taken on line 18—18 of Figure 16.

When the casket lid is lowered, lock-releasing pin 36 projects upwardly through aperture 37 and engages channel stop 59 and with such action bringing the stop out of engaged relation with the engaging lug 58, as shown in Figure 21 and, after which, wrench-receiving stud 57 may be rotated by means of a suitable wrench and the locking fingers moved from the position shown in Figure 15 to the position shown in Figure 16. Upon operation of the device to the locking position, the locking fingers enter slots 62 of the studs 35 and engage the respective pins 63. It will be noted that the locking fingers are each provided with a cam surface 64 which engages the under side of a respective pin 63, with continued motion of the locking fingers causing the lid member to be pulled downwardly toward the body member and causing pressure contact of the lower edges of the lid with the gasket member.

Upon release of the locking device by means of a wrench inserted through sleeve 33, the engaged fingers 47 are disengaged from their respective studs 35 which permits opening of the lid and, with the lid being raised away from pin 36, channel stop 59 engages the lug 58 by action of the spring 61.

It will be noted, by referring to Figures 24 and 25, that the lids are hingedly secured to the casket body by means of loose or slip hinges comprising the body leaf 62 and the lid leaf 63. Hinge leaf 62 has a slot provided therein for the reception of a hook portion of leaf 63. The construction of the hinge permits the lids to automatically adjust themselves to the upper surfaces of the gasket when being closed rather than having the forward squeezing action presented by conventional pin-type hinges.

After the casket lids are closed, a wrench is applied to the wrench-receiving stud 57, the turning of which engages the cam surfaces 64 of the locking fingers into pressure engagement with the respective pins 63 of the lock-engaging studs 35. Due to the locking device being provided both at the forward and rearward edges of the casket, all of the edges of the lids are brought into pressure contact with the gasket including the meeting edges of the head and foot lids bearing against portion 38 of the unitary gasket. Each of the members 50 is provided with apertures 65 to permit entry of the lock-engaging studs 35 as the lids assume their closed positions.

Before placing a body in the casket, the gasket member may be removed by lifting the same vertically from the upper edges of the casket body.

The invention is shown in connection with a casket with head and foot lids, but the same is equally well adapted for use with caskets having a one-piece lid by lengthening the operating bars to extend substantially the full length of the single lid and with the addition of the necessary number of locking fingers 47.

The invention is shown and described in its presently preferred form, but it is desired that it be understood that I am not to be limited to the specific construction and the arrangement of the several parts herein shown and described, but that minor changes may be made therein, insofar as the changes may fall within the scope of the appended claims.

Having now fully shown and described the invention, what I claim and desire to secure by Letters Patent of the United States is:

1. In a casket sealing device, a unitary gasket member having side and end portions, an inwardly-directed slot formed horizontally in the side and end portions, a continuous angular member having one leg thereof extending into the slot, an integrally-formed transverse portion of the gasket extending between the side portions intermediate the ends, a central supporting member underlying the transverse portion of the gasket, and with the ends of the central supporting member being rigidly secured to the angular member.

2. In combination with a casket body having a hinged lid, a locking device providing means locking the lid in closed position with relation to the casket body, said locking device comprising two operating bars, one of which is located within the rear edge of the lid and with the other being located within the forward edge of the lid with an operating rod extending between and connected with the operating bars, locking fingers pivotally positioned on each of the operating bars, with the operating bars connecting the operating rod with the locking fingers and providing simultaneous operation of the locking fingers, said fingers being adapted to engage lock-engaging studs secured in and extending upwardly from the casket body, a stop lug fixedly secured on and carried by the operating rod, a spring-urged stop member adapted to engage the stop lug and providing means holding the locking fingers in retracted relation when the lid is in open position.

3. In combination with a casket body having a hinged lid, a locking device providing means locking the lid in closed position with relation to the casket body, said locking device comprising two operating bars forming linkages, one of which is located within the rear edge of the lid and with the other being located within the forward edge of the lid, a lock operating rod located in and extending across the end of the lid between and connected with the operating bars, locking fingers positioned on each of the operating bars, with said lock operating rod being connected with the locking fingers through linkages and providing simultaneous operation thereof, said locking fingers being adapted to engage lock-engaging studs secured in and extending upwardly from the casket body, a stop lug fixedly secured on and carried by the lock operating rod, and with a spring-urged stop means adapted to engage the stop lug and providing means for holding the locking fingers in retracted relation when the lid is in open position.

References Cited in the file of this patent

UNITED STATES PATENTS

| | | |
|---|---|---|
| 727,293 | Coin | May 5, 1903 |
| 1,426,776 | Riecken | Aug. 22, 1922 |
| 1,871,453 | Cobb | Aug. 16, 1932 |
| 2,337,316 | Dodge | Dec. 21, 1943 |
| 2,415,948 | Hillenbrand | Feb. 18, 1947 |
| 2,533,828 | McEwan | Dec. 12, 1950 |
| 2,585,363 | Woltering | Feb. 12, 1952 |
| 2,625,731 | Richmond | Jan. 20, 1953 |
| 2,706,577 | Wolf | Apr. 19, 1955 |
| 2,708,302 | Wilkirson | May 17, 1955 |
| 2,723,147 | Slaughter et al. | Nov. 8, 1955 |
| 2,728,971 | Harter | Jan. 3, 1956 |
| 2,848,782 | Gillison | Aug. 26, 1958 |